Patented June 20, 1933

1,914,942

UNITED STATES PATENT OFFICE

HENRY DREYFUS, OF LONDON, AND GEORGE HOLLAND ELLIS, TOBIAS OCKMAN AND HENRY CHARLES OLPIN, OF SPONDON, NEAR DERBY, ENGLAND, ASSIGNORS TO CELANESE CORPORATION OF AMERICA, A CORPORATION OF DELAWARE

DYEING, PRINTING, OR STENCILING OF MATERIALS MADE OF OR CONTAINING CELLULOSE DERIVATIVES

No Drawing. Application filed April 19, 1929, Serial No. 356,601, and in Great Britain April 26, 1928.

This application, which is a continuation in part of U. S. application Serial No. 162,938 filed 22nd January, 1927, relates to the dyeing, printing, stenciling or otherwise colouring of threads, yarns, knitted or woven fabrics or other products made of or containing cellulose acetate or other organic acid esters of cellulose, such for example as cellulose formate, propionate, or butyrate, or the products obtained by the treatment of alkalized cellulose with esterifying agents (e. g. the product known as "immunized cotton"), or made of or containing cellulose ethers, such as methyl, ethyl, or benzyl cellulose, or the corresponding condensation products of cellulose and glycols or other polyhydric alcohols, all of which cellulose derivatives are hereinafter referred to as organic substitution derivatives of cellulose.

U. S. application S. No. 162,938 describes and claims, inter alia, the dyeing or otherwise colouring of the said organic substitution derivatives of cellulose by means of dyestuffs or compounds containing one or more urea or thiourea residues. In the course of further researches we have found that especially useful results are obtained by dyeing or otherwise colouring the cellulose acetate or other organic substitution derivatives of cellulose with particular unsulphonated colouring matters or compounds of this class which are azo dyes obtainable by coupling diazotized amino-substituted symmetrical diarylureas or diarylthioureas with azo coupling components. The aryl groups may contain further substituents such as halogen, or alkyl, alkyloxy, amino, or acidyl-amino groups. The dyeing or colouring with the azo dyes may be effected directly or by producing the azo dye within the cellulose derivative, for example, by treating the material first with the amino compound, then with nitrous acid to effect diazotization, and finally with the coupling component. When the colouring matters contain diazotizable amino groups they may be diazotized on the materials and developed in the customary manner.

The following table shows the shades given by some colouring matters which may be used according to the invention,

| Colouring matter. | Shade. |
|---|---|
| Disazo dye from tetrazotized 4:4'-diaminodiphenylurea and 2 mols. phenol | Pure yellow |
| Disazo dye from tetrazotized 4:4'-diaminodiphenylurea and 2 mols. m-phenylenediamine | Golden orange |
| Disazo dye from tetrazotized 5:5'-diamino-2:2'-dimethyl diphenylurea and 2 mols. phenol | Yellow |
| Disazo dye from tetrazotized 4:4'-diamino-3:3'-diacetylamino diphenyl urea and 2 mols. phenol | Yellow |
| Disazo dye from tetrazotized 4:4'-diamino-2:6:2':6'-tetrachlor diphenyl urea and 2 mols. phenol | Greenish-yellow |
| Disazo dye from tetrazotized 4:4'-diamino diphenylthiourea and 2 mols. m-phenylenediamine | Orange yellow |
| Disazo dye from tetrazotized 4:4'-diamino diphenylthiourea and 2 mols. phenol | Yellow |

The colouring matters or compounds may be applied in aqueous solution (when sufficiently soluble), or in aqueous suspensions or colloidal solutions or dispersions obtained by grinding (for example in colloid mills), by dissolving in a solvent and pouring into water containing or not containing protective colloids or dispersators, by pretreating the colouring matters or compounds with dispersing agents or by other methods. Of the dispersing agents which are suitable for obtaining such dispersions may be mentioned those described in U. S. Patent Specifications Nos. 1,618,413, 1,618,414 and 1,694,413 and British Patents Nos. 273,819 and 273,820; viz. bodies of oily or fatty characteristics, namely higher fatty acids or sulphonated or other derivatives thereof containing salt-forming groups, such as sulphoricinoleic acid or other sulphonated fatty acids or salts of such acids or bodies, for instance their alkali or ammonium salts, used alone or in conjunction with auxiliary solvents as described in U. S. Patent Specification No. 1,690,481 and British Patent No. 269,960; carbocyclic compounds containing in their structure one or more salt forming groups or salts of such compounds; sulpho-aromatic fatty acids or salts thereof; and soluble resin soaps or sodium or other soluble salts of resin acids.

Mixed goods containing for example, in addition to the organic substitution derivative or derivatives of cellulose, cotton, silk, wool, or the cellulose type of artificial silk or other fibres or threads, may be dyed or otherwise coloured with or without employment of other dyestuffs or components according to the character of the threads or fibres used in association, such other dyestuffs or components being applied if desired either before or after the application of the colouring matters or compounds of the present invention, or when not deleteriously affected thereby, they may be applied in conjunction there with.

The following examples illustrate the invention but are not to be regarded as limiting it in any way.

*Example 1*

To dye a pure yellow shade on 10 kilograms of cellulose acetate knit fabric, 400 grams of a 25% aqueous paste of the dyestuff obtained by coupling 1 molecular proportion of tetrazotized 4:4′ diamino-diphenylurea with 2 molecular proportions of phenol are well stirred into 300-400 grams of the sulphoaromatic fatty acid product prepared according to Example A of U. S. Patent Specification No. 1,694,413. The mixture is heated until the maximum degree of dispersion is achieved, and then diluted with boiling water and added through a filter cloth to 300 litres of water contained in a suitable dyeing machine. The goods are entered and processed with rising temperatures according to the common methods of dyeing until the shade is achieved. They are now lifted, rinsed, and dried or otherwise treated as requisite.

By replacing the cellulose acetate fabric in this example by a cellulose formate fabric the latter is likewise dyed in yellow shades.

*Example 2*

To dye 10 kilos of cotton cellulose acetate goods (50:50), the cotton a blue shade, and the cellulose acetate golden orange.

The cotton portion of the goods is first dyed with Duranthrene blue G. C. D. (Colour Index No. 1113) by the method detailed in Example 2 of U. S. application Serial No. 83,138 filed 22nd January, 1926, and the undyed cellulose acetate then covered as follows:—

250 grams of 25% aqueous paste of the dyestuff obtained by coupling 1 molecular proportion of tetrazotized 4:4′-diamno-diphenylurea with 2 molecular proportions of m-phenylene-diamine are well stirred with 250 ccs. of turkey red oil (50%); the mixture is heated with an open steam pipe, diluted with boiling water, and further boiled. The dyebath is then made up, the fabric entered, and dyeing carried out as in Example 1 above, the goods being afterwards lifted, rinsed, and dried, or otherwise treated as requisite.

What we claim and desire to secure by Letters Patent is:—

1. Process for dyeing materials comprising organic substitution derivatives of cellulose which comprises dyeing them with unsulphonated azo colouring matters of the general formula

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

2. Process for dyeing materials comprising organic substitution derivatives of cellulose which comprises dyeing them by forming thereon unsulphonated azo colouring matters of the general formula

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

3. Process for dyeing materials comprising organic substitution derivatives of cellulose which comprises dyeing them with diazotizable unsulphonated azo colouring matters of the general formula

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component, and diazotizing and developing with an azo coupling component.

4. Process for dyeing materials comprising cellulose acetate which comprises dyeing them with unsulphonated azo colouring matters of the general formula

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

5. Process for dyeing materials comprising cellulose acetate which comprises dyeing them by forming thereon unsulphonated azo colouring matters of the general formula

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

6. Process for dyeing materials comprising cellulose acetate which comprises dyeing them with diazotizable unsulphonated azo colouring matters of the general formula.

$$R_1-NH-CX-NH-R_2$$

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component, and diazotizing and developing with an azo coupling component.

7. Process for dyeing materials comprising cellulose acetate which comprises dyeing them with aqueous colloidal dispersions of unsulphonated azo colouring matters of the general formula $$R_1-NH-CX-NH-R_2$$

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

8. Materials comprising organic substitution derivatives of cellulose dyed with unsulphonated azo colouring matters of the general formula $$R_1-NH-CX-NH-R_2$$

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

9. Materials comprising cellulose acetate dyed with unsulphonated azo colouring matters of the general formula $$R_1-NH-CX-NH-R_2$$

wherein X represents oxygen or sulphur, and $R_1$ and $R_2$ represent aryl or substituted aryl residues at least one of which is of the type $-R-N=N-R_3$, R being an aryl residue and $R_3$ the residue of a coupling component.

10. Process for dyeing materials comprising organic substitution derivatives of cellulose which comprises applying thereto azo coloring matters free from sulphonic groups and obtainable by diazotizing and coupling with coupling components compounds of the general formula $NH_2.CX.NH_2$, in which X represents oxygen or sulphur, symmetrically substituted in the $NH_2$ groups by two aryl groups at least one of which contains a diazotizable amino group.

11. Process for dyeing materials comprising organic substitution derivatives of cellulose which comprises applying thereto azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two aryl groups at least one of which contains a diazotizable amino group.

12. Process for dyeing materials comprising organic substitution derivatives of cellulose which comprises applying thereto azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two phenyl groups at least one of which contains a diazotizable amino group.

13. Process for dyeing materials comprising organic substitution derivatives of cellulose which comprises applying thereto azo coloring matters free from sulphonic and carboxylic groups and obtainable by diazotizing and coupling with coupling components of the benzene series compounds of the general formula $NH_2.CX.NH_2$, in which X represents oxygen or sulphur, symmetrically substituted in the $NH_2$ groups by two aryl groups at least one of which contains a diazotizable amino group.

14. Process for dyeing materials comprising organic substitution derivatives of cellulose which comprises applying thereto azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two phenyl groups at least one of which contains a diazotizable amino group and at least one a substituent selected from the group consisting of halogen, alkyl, alkoxy and acidylamino.

15. Materials comprising organic substitution derivatives of cellulose colored with azo coloring matters free from sulphonic groups and obtainable by diazotizing and coupling with coupling components compounds of the general formula $NH_2.CX.NH_2$, in which X represents oxygen or sulphur, symmetrically substituted in the $NH_2$ groups by two aryl groups at least one of which contains a diazotizable amino group.

16. Materials comprising organic substitution derivatives of cellulose colored with azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two aryl groups at least one of which contains a diazotizable amino group.

17. Materials comprising organic substitution derivatives of cellulose colored with azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two phenyl groups at least one of which contains a diazotizable amino group.

18. Materials comprising organic substitution derivatives of cellulose colored with azo coloring matters free from sulphonic and carboxylic groups and obtainable by diazotizing and coupling with coupling components of the benzene series compounds of the general formula $NH_2.CX.NH_2$, in which X represents oxygen or sulphur, symmetrically substituted in the $NH_2$ groups by two aryl groups at least one of which contains a diazotizable amino group.

19. Materials comprising organic substitution derivatives of cellulose colored with azo coloring matters free from sulphonic and carboxylic groups and obtainable by diazotizing and coupling with coupling components compounds of the general formula $NH_2.CX.NH_2$, in which X represents oxygen or sulphur, symmetrically substituted in the $NH_2$ groups by two phenyl groups at least one of which contains a diazotizable amino group and at least one a substituent selected from the group consisting of halogen, alkyl, alkoxy and acidylamino.

In testimony whereof we have hereunto subscribed our names.

HENRY DREYFUS.
GEORGE HOLLAND ELLIS.
TOBIAS OCKMAN.
HENRY CHARLES OLPIN.